Patented Oct. 14, 1941

2,259,356

UNITED STATES PATENT OFFICE 2,259,356

PROCESS FOR MAKING MERCAPTOBENZOTHIAZOLES

Claude H. Smith, Tallmadge, Ohio, assignor to Wingfoot Corporation, Wilmington, Del., a corporation of Delaware No Drawing. Application July 23, 1940, Serial No. 347,001

5 Claims. (Cl. 260—306)

This invention relates to a method for making mercaptoarylenethiazoles and more particularly to a method for converting di(arylenethiazyl) disulfides into the corresponding 2-mercaptoarylenethiazoles.

Di(arylenethiazyl) disulfides are customarily prepared by oxidizing the corresponding 2-mercaptoarylenethiazole. The treatment required is rather specific and the oxidation is of such a character that a high degree of care must be exercised in selecting the oxidizing agents and reaction conditions employed. U. S. Patent 1,880,421 describes treating a 2-mercaptoarylthiazole with dilute nitric acid; U. S. Patent 2,024,567 and U. S. Patent 2,024,575 describe the use of hydrogen peroxide; and U. S. Patent 2,043,949 describes the use of ammonium and alkali metal persulfates. Chlorine and certain other oxidizing agents may also be used. There has been no reported observation to indicate that these reactions are reversible to any substantial degree.

In commercial practice, it has been found that the formation of the di(arylenethiazyl) disulfide may be carried out so that the major portion of the product is obtained in finely divided form and with a high degree of purity so that it may generally be employed directly as an accelerator of the vulcanization of rubber and for other purposes. However, a small amount of the di(arylenethiazyl) disulfide is often obtained admixed with various impurities so that it is not suitable for direct use. When the di(arylenethiazyl) disulfide is prepared by treating the corresponding 2-mercaptoarylenethiazole with hydrogen peroxide a small portion of the product is almost invariably obtained in the form of hard aggregates of the general size, nature and appearance of sand, which aggregates have been found to consist of the di(arylenethiazyl) disulfide admixed with and bonded together by the corresponding arylenethiazole, sulfur and other impurities. This sandy material is not suitable for use in the compounding of rubber and does not readily lend itself to further refinement and, therefore, in the past it has been a waste material and constituted an economic loss.

According to the present invention, a method has been discovered whereby these hard, sandy aggregates of di(arylenethiazyl) disulfide in admixture with the corresponding arylenethiazole, sulfur and other impurities may be conveniently and economically reclaimed by converting them into the corresponding 2-mercaptoarylenethiazole which itself may be used industrially or which may be reconverted into the di(arylenethiazyl) disulfide.

According to the practice of the invention, the impure di(arylenethiazyl) disulfide is mixed with materials which react under suitable conditions of temperature and pressure to produce the corresponding 2-mercaptoarylenethiazole in a molten condition and with the production of substantial quantities of by-product hydrogen sulfide. Such methods are illustrated by that described in U. S. 1,631,871 to Kelly, according to which most of the commercial 2-mercaptoarylenethiazoles have been prepared to date. According to the process described in this patent, 2-mercaptobenzothiazole is prepared by reacting aniline with sulfur and carbon bisulfide at a temperature of about 150–300° C. with the production, theoretically, of one mol of hydrogen sulfide for each mol of 2-mercaptobenzothiazole produced. Other 2-mercaptoarylenethiazoles are prepared by replacing the aniline with other primary aromatic amines having a free ortho position.

According to the present invention, the hard, sandy aggregates of impure di(arylenethiazyl) disulfide may be admixed with the carbon bisulfide, sulfur and primary aromatic amine employed as reactants in the Kelly process and the composite mixture is then treated according to the method described in the Kelly patent. The exact and entire constitution of the impure di(arylenethiazyl) disulfides is not known with certainty but it has been determined by analysis that they usually contain a major proportion, e. g. about 75%, of the di(arylenethiazyl) disulfide and a minor proportion, e. g. about 25%, of the corresponding arylenethiazole, sulfur and other impurities. The mechanism whereby the di(arylenethiazyl disulfide and the various impurities are converted into the corresponding 2-mercaptoarylenethiazole is not known with certainty but, in view of the observed conversion, it is reasonable to suppose that the di(arylenethiazyl) disulfide is reduced to the corresponding 2-mercaptoarylenethiazole by the action of the hydrogen sulfide resulting from the interaction of the carbon bisulfide, sulfur and primary aromatic amine. This mechanism may be represented by the following equation, in which dibenzothiazyl disulfide is employed as an example:

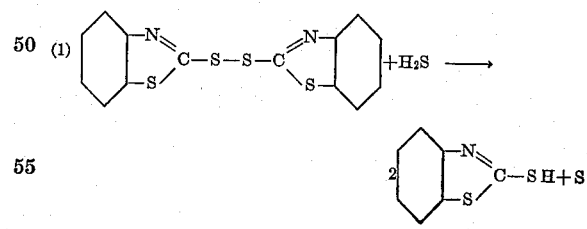

The conversion of the arylenethiazole into the corresponding 2-mercapto arylenethiazole may result from the action of the sulfur added as a reactant or that present as an impurity. This may be represented by the following equation, in which benzothiazole is employed as an example:

(2) 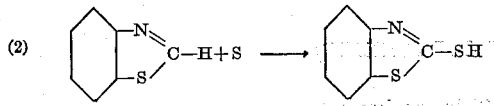

Whatever the actual mechanism of the reactions involved the di(arylenethiazyl) disulfide, the arylenethiazole and other impurities are converted into the corresponding 2-mercaptoarylenethiazole in a substantially complete manner so that, in large scale production and over a period of time, practically all of these materials may be recovered as usable 2-mercaptoarylenethiazoles. This conversion is of considerable practical importance and makes possible sizable savings in operating costs in view of the large volume of material handled during the course of a year.

In practice, the amount of di(arylenethiazyl) disulfide which it is desired to reconvert into the corresponding 2-mercaptoarylenethiazole will be small. For example, the impure sandy material is only a very small percentage of the disulfide formed and, when regularly worked away in succeeding batches, forms only a minor proportion of the reactant mass. These small amounts do not noticeably influence the course of the main reaction.

In addition to the process described in U. S. Patent No. 1,631,871 there are a number of other processes for preparing 2-mercaptoarylenethiazoles which, for the purposes of the present invention, may be considered to be full equivalents of the Kelly process. In general, these processes employ various possible intermediate products of the reaction mixture consisting of carbon bisulfide, sulfur and a primary aromatic amine. The reaction conditions employed for each are approximately the same, i. e., they are in the same range, and each of them produces the 2-mercaptoarylenethiazole in a molten condition and with the formation of substantial quantities of by-product hydrogen sulfide. Similar results are obtained if the hydrogen sulfide is added as a reactant but it is usually more convenient to take advantage of its formation as a by-product. A number of these related processes are known and they may be illustrated by the processes described in U. S. Patent No. 1,891,198 which describes the use of dianilino methane, sulfur and carbon bisulfide; U. S. Patent No. 2,070,522 which describes the use of formanilid, sulfur and carbon bisulfide; U. S. Patent No. 1,858,344 which describes the use of anilinobenzothiazole and hydrogen sulfide; U. S. Patent No. 1,712,968 which describes the use of diphenylthiourea, carbon bisulfide and sulfur; U. S. Patent No. 1,972,963 which describes the use of anhydroformaldehyde-aniline and sulfur; and U. S. Patent No. 1,865,477 which describes the use of o, o'-diaminodiphenyldisulfide and carbon bisulfide.

While only the preferred embodiments of the invention have been described in detail, it will be apparent to those skilled in the art that various modifications may be made therein without departing from the spirit of the invention or from the scope of the appended claims.

What I claim is:

1. A method of making 2-mercaptoarylenethiazoles which comprises heating a di(arylenethiazyl) disulfide in a closed vessel at a temperature of about 150 to 300° C., in the presence of carbon bisulfide, sulfur and an amine having a free ortho position.

2. A method of reclaiming an impure di(arylenethiazyl) disulfide which comprises adding it to a mixture of materials which react under conditions producing a molten 2-mercaptoarylenethiazole in the presence of hydrogen sulfide, reacting the mixture to produce the 2-mercaptoarylenethiazole and recovering the 2-mercaptoarylenethiazole.

3. A method of reclaiming agglomerates of a di(arylenethiazyl) disulfide containing the corresponding arylenethiazole, sulfur and other impurities and produced when the corresponding 2-mercaptoarylenethiazole is treated with hydrogen peroxide to form the di(arylenethiazyl) disulfide which comprises adding said agglomerates to a mixture of materials which react to produce the corresponding 2-mercaptoarylenethiazole in a molten condition together with by-product hydrogen sulfide and reacting the mixture to produce said 2-mercaptoarylenethiazole.

4. A method of reclaiming agglomerates of a di(arylenethiazyl) disulfide containing the corresponding arylenethiazole, sulfur and other impurities and produced when the corresponding 2-mercaptoarylenethiazole is treated with hydrogen peroxide to form the di(arylenethiazyl) disulfide which comprises adding said agglomerates to a mixture of carbon bisulfide, sulfur and an aromatic amine having a free ortho position and reacting the mixture to produce a 2-mercaptoarylenethiazole.

5. A method of reclaiming an impure di(arylenethiazyl) disulfide, containing impurities of substantially the same character as those present in the sandy agglomerates of impure di(arylenethiazyl) disulfide produced when the corresponding 2-mercaptoarylenethiazole is treated with hydrogen peroxide to produce the di(arylenethiazyl) disulfide, which comprises adding said impure di(arylenethiazyl) disulfide to a mixture of materials which react to produce the corresponding 2-mercaptoarylenethiazole in a molten condition together with a substantial quantity of by-product hydrogen sulfide and reacting the mixture to produce the said 2-mercaptoarylenethiazole.

CLAUDE H. SMITH.